(12) United States Patent
Boles et al.

(10) Patent No.: US 7,962,513 B1
(45) Date of Patent: Jun. 14, 2011

(54) SYSTEM AND METHOD FOR DEFINING AND IMPLEMENTING POLICIES IN A DATABASE SYSTEM

(75) Inventors: David Boles, Austin, TX (US); H. Bret Young, Madison, AL (US); Jack Basiago, Toney, AL (US)

(73) Assignee: Crossroads Systems, Inc., Austin, TX (US)

( * ) Notice: Subject to any disclaimer, the term of this patent is extended or adjusted under 35 U.S.C. 154(b) by 317 days.

(21) Appl. No.: 11/589,333

(22) Filed: Oct. 30, 2006

Related U.S. Application Data (60) Provisional application No. 60/731,800, filed on Oct. 31, 2005, provisional application No. 60/795,466, filed on Apr. 27, 2006.

(51) Int. Cl.
*G06F 7/00* (2006.01)
*G06F 17/30* (2006.01)
(52) U.S. Cl. ....................................... 707/781
(58) Field of Classification Search ......................... None
See application file for complete search history.

(56) References Cited

U.S. PATENT DOCUMENTS

| | | | |
|---|---|---|---|
| 5,261,102 A | 11/1993 | Hoffman | |
| 5,713,018 A | 1/1998 | Chan | |
| 5,721,904 A | 2/1998 | Ito et al. | |
| 5,864,659 A * | 1/1999 | Kini | 714/31 |
| 6,393,428 B1 | 5/2002 | Miller et al. | |
| 6,487,552 B1 * | 11/2002 | Lei et al. | 707/4 |
| 6,606,626 B1 | 8/2003 | Ponnekanti | |
| 7,017,183 B1 * | 3/2006 | Frey et al. | 726/5 |
| 7,058,622 B1 | 6/2006 | Tedesco | |
| 7,092,955 B2 | 8/2006 | Mah et al. | |
| 7,143,080 B2 | 11/2006 | Tedesco | |
| 7,155,737 B1 | 12/2006 | Lim et al. | |
| 7,502,836 B1 | 3/2009 | Menditto et al. | |
| 7,831,621 B1 | 11/2010 | Banks et al. | |
| 2003/0023588 A1 | 1/2003 | Shetty | |
| 2003/0105739 A1 | 6/2003 | Essafi et al. | |
| 2003/0135505 A1 * | 7/2003 | Hind et al. | 707/100 |
| 2004/0267674 A1 | 12/2004 | Feng et al. | |

(Continued)

FOREIGN PATENT DOCUMENTS

JP    2002-163260 A    6/2002

(Continued)

OTHER PUBLICATIONS

Karjoth, Gunter, "Access Control with IBM Tivoli Access Manager," 2003, ACM Transactions on Information and System Security, vol. 6, No. 2, pp. 232-257.*

(Continued)

*Primary Examiner* — Pierre M Vital
*Assistant Examiner* — Rachel J Lee
(74) *Attorney, Agent, or Firm* — Sprinkle IP Law Group (57) ABSTRACT

Embodiments of the present invention provide systems and methods for applying policies at a database appliance. The database appliance, according to one embodiment, can receive a database request and determine a set of information related to the request. The information related to the request can include information, such as metadata, defined at information systems external to the database server to which the request is directed. Policies can be applied in terms of the information related to the request. By leveraging information systems, embodiments of the present invention allow policies to be applied to account for the networked environment.

20 Claims, 3 Drawing Sheets

U.S. PATENT DOCUMENTS

| | | | |
|---|---|---|---|
| 2005/0050046 | A1 | 3/2005 | Puz et al. |
| 2005/0060293 | A1 | 3/2005 | Day et al. |
| 2005/0188220 | A1 | 8/2005 | Nilsson et al. |
| 2005/0210011 | A1 | 9/2005 | Sauermann et al. |
| 2005/0278362 | A1 | 12/2005 | Maren et al. |
| 2006/0004828 | A1 | 1/2006 | Rajamani et al. |
| 2006/0089932 | A1* | 4/2006 | Buehler et al. ............... 707/9 |
| 2006/0117014 | A1* | 6/2006 | Qi ............... 707/9 |
| 2006/0184530 | A1* | 8/2006 | Song et al. ............... 707/9 |
| 2006/0190455 | A1* | 8/2006 | Braddy et al. ............... 707/9 |
| 2006/0212524 | A1 | 9/2006 | Wu et al. |
| 2006/0248085 | A1* | 11/2006 | Sack et al. ............... 707/9 |
| 2006/0262976 | A1 | 11/2006 | Hart et al. |
| 2006/0277184 | A1* | 12/2006 | Faitelson et al. ............... 707/9 |
| 2007/0094266 | A1 | 4/2007 | Parikh et al. |
| 2007/0276835 | A1 | 11/2007 | Murthy |

FOREIGN PATENT DOCUMENTS

| | | |
|---|---|---|
| WO | WO 03/040923 A1 | 5/2003 |
| WO | WO2004/0042621 | 5/2004 |

OTHER PUBLICATIONS

Sloman et al., "Security and Management Policy Specification," 2002, IEEE Network, pp. 10-19.*

Pearlman et al., "A Community Authorization Service for Group Collaboration," IEEE, 2002.*

Wohrer et al., "Virtualization of Heterogeneous Data Sources for Grid Information Systems," CiteSeerX, 2004.*

Czajkowki et al. "Grid Information Services for Distributed Resource Sharing," IEEE, 2001.*

Office Action issued in U.S. Appl. No. 11/796,223, mailed May 11, 2009, 11 pgs.

Office Action issued in U.S. Appl. No. 11/796,223, mailed Dec. 10, 2009, 14 pgs.

Office Action issued in U.S. Appl. No. 11/904,605, mailed Feb. 3, 2010, 12 pgs.

Canahuate et al., "Update Conscious Bitmap Indices," Scientific and Statistical Database Management, 2007, SSBDM '07, 19th International Conference, Jul. 2007, pp. 1-10.

Office Action issued in U.S. Appl. No. 11/796,223, mailed Jul. 13, 2010, 17 pgs.

Spinellis, Diomidis, "The Design and Implementation of a Legal Text Database," Filothei, Greece, Sep. 1994, pp. 339-348.

Notice of Allowance issued in U.S. Appl. No. 11/904,605, mailed Sep. 1, 2010, 9 pgs.

Office Action for U.S. Appl. No. 11/796,223, mailed Nov. 29, 2010, 20 pgs.

Canahuate et al., "Update Conscious Bitmap Indices," Scientific and Statistical Database Management, 2007, SSBDM '07, 19th International Conference, Jul. 2007, p. 1-10, download: http://ieeexplore.ieee.org/stamp/stamp.jsp?isnumber=4274938&arnumber=4274960& punumber=4274937&tag=1.

Office Action issued in U.S. Appl. No. 11/796,223, mailed Jul. 13, 2010, 17 pgs.

Spinellis, Diomidis, "The Design and Implementation of a Legal Text Database," Filothei, Greece, Sep. 1994, pp. 339-348.

* cited by examiner

SYSTEM AND METHOD FOR DEFINING AND IMPLEMENTING POLICIES IN A DATABASE SYSTEM

RELATED APPLICATIONS

The present application claims priority under 35 U.S.C. 119(e) to U.S. Provisional Patent Application No. 60/731,800, filed Oct. 31, 2005 entitled "System and Method for Defining and Implementing Policies in a Database System" and U.S. Provisional Patent Application No. 60/795,466, filed Apr. 27, 2006 entitled "Method for Optimizing Database Policy Enforcement on a SIMD-Based Microprocessor System" each of which is fully incorporated by reference herein.

TECHNICAL FIELD OF THE INVENTION

This invention relates generally to database systems. More particularly, the present invention relates to methods and systems for implementing policies in a database system. Even more particularly, embodiments of the present invention relate to a systems and methods for implementing policies in a database system using data external to the database.

BACKGROUND OF THE INVENTION

Early database systems utilized large centralized computers to store data and terminal devices physically connected to the centralized computer to provide user access to the data. In these early systems, the database management system had all the knowledge necessary to place constraints on data access. The entities defined in the database management system (i.e., users, tables, columns, rows, functions) could be used by the database management system to restrict or allow access to data and operations by users.

More recently, most database systems have been implemented in networked environments in which users can access a database from a variety of heterogeneous clients. The security model used by many current database systems, however, extends from the security model developed in early database systems. In such systems, describing the constraints on access and usage of data to meet security requirements is done in terms of entities internal to the database itself and these descriptions are maintained/interpreted by the database itself. In other words, security policies to perform operations on data in the database are defined based on entities defined in the database itself.

Current database security schemes are insufficient because of the complexity inherent in a networked environment, which grows non-linearly with the number of components in the networked environment. As an example, a user may attempt to access data in a corporate database from an office computer and a home computer via a virtual private network ("VPN"). If the database has entities for users, but not for network attributes (say IP address of a request), the database management system will only be able to restrict access to the data based on the user, not the location from which the user is attempting to access the data. In order to restrict access based on a request generated by a local LAN versus over a VPN, new entities would have to be created in the database to implement the security constraint. Under this model, effective management of security would require predicting which entities are necessary in the database to apply security constraints. However, as individual components on the network are arbitrarily used, the behavior of the aggregate system is changed in ways that are impossible to predict from a practical standpoint. Consequently, a security model that relies solely on entities known to the database management system is insufficient for robust security in a networked environment.

SUMMARY OF THE INVENTION

Embodiments of the present invention provide systems and methods for applying database access policies that substantially eliminate or reduce the disadvantages of previously developed database security systems and methods. More particularly, embodiments of the present invention provide systems and methods that allow access policies to be defined in terms of information that may not be known to the database server to which access is being restricted.

One embodiment of the present invention includes a method for applying security policies to database requests comprising mapping one or more pieces of information to corresponding metadata at a database appliance, receiving a database request at the database appliance coupled between a database client and a database server, determining a set of metadata corresponding to the database request and applying one or more policies to determine whether to allow the database request at least partially based on the set of metadata corresponding to the database request.

Another embodiment of the present invention includes a method for applying security policies to database requests comprising receiving a database request at a database appliance coupled between a database client and a database server, determining a set of information related to the database request, wherein at least a portion of the information related to the database request is retrieved from an information system external to the database server and the database client and applying one or more policies to determine whether to allow the database request based on the set of information related to the database request.

Yet another embodiment of the present invention provides a database appliance configured to connect between a database client and a database server, the database appliance comprising a processor, a computer readable memory accessible by the processor and a set of computer instructions stored on the computer readable memory. The set of computer instructions can comprise instructions executable by the processor to determine a set of information related to a request received by the database appliance that includes information retrieved from an information system external to the database client and the database server and apply one or more policies to determine whether to allow the request based on the set of information related to the database request.

Embodiments of the present invention provide an advantage over prior art systems and methods of restricting access to databases by allowing policies to be defined in terms of metadata defined external to the database server and client. This allows policies to be defined in a manner that accounts for the aggregate network environment, not just the entities known to the database server.

Embodiments of the present invention provide another advantage by allowing policies for database access to be defined in a normalized uniform namespace.

Embodiments of the present invention provide yet another advantage by allowing security policies to be defined in a manner that accounts for the changing network environment. For example, a policy that restricts access by engineers to certain tables in a database (such as research and design tables) does not have to be redefined as new users are added to the engineering group.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts of the various drawings.

Broadly speaking, embodiments of the present invention provide systems and methods for leveraging information about a networked environment to apply security policies to database requests. According to one embodiment of the present invention, a database appliance resides at a choke point to a database server and receives activity requests to the database server. For a database request, the database appliance can apply policies to the request to allow the request, deny the request or take some other action based on information related to the request including information in the request, metadata corresponding to information in the request or other information related to the request. The database appliance can utilize network information maintained by other systems (e.g., network servers, domain servers, identity management systems and other systems) to apply policies that account for the complexity of the aggregate network. The processing involved in applying policies to a request optionally can be optimized for processing by a single instruction, multiple data ("SIMD") processor.

Figure 1:
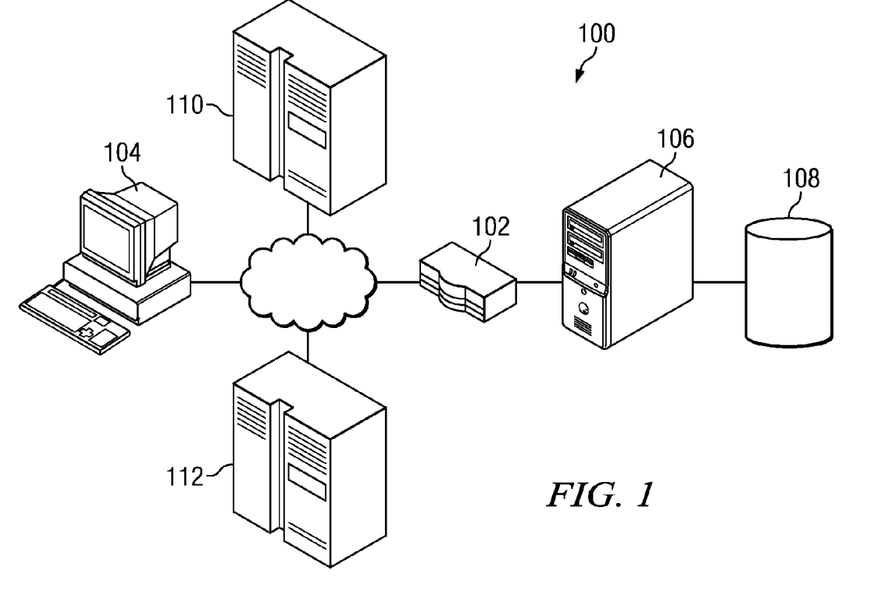
FIG. 1 is a diagrammatic representation of one embodiment of a system in which embodiments of the present invention can be implemented.

FIG. 1 is a diagrammatic representation of a simplified system 100 including a database appliance 102, a database client 104, a database server 106 that manages database 108 and information systems 110 and 112 that maintain metadata about users, the aggregate network environment or other information. According to one embodiment, database client 104 and database server 106 can be a standard database client 104 and database server 106 that do not require special configuration (i.e., they can include "off-the-shelf" software). In other embodiments, database client 104 or database server 106 can include proprietary configurations. In general, database client 104 is configured to generate requests, such as SQL requests or other database requests, to database server 106 via a network (e.g., a LAN, the Internet, a wireless network or other network known in the art). Database server 106 is configured to receive and process the requests to perform functions (e.g., create, read, update, delete or other functions) on data stored in database 108.

Database server 106 defines various database entities including, but not limited to, tables, columns, procedures, schemas, catalogs, users, indexes, views, constraints, application names, protocol version, protocol options and other database entities. Server 106 can apply standard database security mechanisms to activity requests from database client 104 in terms of entities known to database server 106. Additional (or all) security policies can be applied by database appliance 102 as discussed below to allow or deny requests by database client 104 to database server 106.

Database appliance 102 is preferably placed at a control point to database server 106 such that all requests to database server 106 pass through database appliance 102. For example, database appliance 102 can be placed between the ports of database management system (i.e., the ports of a database server) and the rest of the network. From the perspective of database client 104, database management system 106 is behind database appliance 102. In more complicated network architectures, multiple database appliances 102 can be deployed at multiple control points for database management system 106. Database appliance 102 can apply policies to activity requests from database client 104 directed to database server 106 to determine whether to allow the requests, deny the requests or take some other action.

Database appliance 102, according to one embodiment of the present invention, can maintain mappings of database entities and information contained in database requests to metadata defined at database appliance 102. For example, every entity known to database server 106 can be mapped to a human readable name (e.g., the entity "PRM_CFACBS" can be mapped to the name "Primary Customer Table"). Just as database entities can be mapped to human-readable names, groups of entities, users, columns, etc. can also be created, named, edited and managed. For example, users can be mapped to user groups, departments or other aggregations of users, database tables can be mapped to an Accounts class of tables or other business category, IP addresses can be mapped to computer groups, VPN connections or other category of addresses and so on. Thus, specific pieces of information can be mapped to metadata, such as category names etc., defined external to database server 106.

Additionally, metadata from information systems 110 and 112 can be utilized by database appliance 102. Information systems 110 and 112 can be any systems, such as metadata repositories, external to database appliance 102 with which database appliance 102 communicates to retrieve information for implementing policies. Table 1 below lists several example information systems and the types of metadata maintained. It should be noted, however, system 100 can include any number or types of information systems and that the information systems can include additional information than the example information provided by Table 1:

TABLE 1

| Information System | Information |
|---|---|
| LDAP | LDAP servers maintain directory information about data elements such as organizational units, printers, documents, groups of people and other information. |
| Identity Management | Identity management servers commonly maintain information regarding users, accounts, passwords, privileges, provisioning processes, deactivation processes and platforms. |
| Database Servers | Database servers can maintain information about users, privileges, LDAP server connections, entities maintained by the database and other information. |
| Domain Name Servers | IP address to Name Mappings. Domain Name Servers can maintain information about IP Address to System Name translations. |
| Network Access Control Systems | Network Access Control Systems can maintain information about valid systems and network topology. |
| File Servers | Network File Servers can maintain export information about the availability of space, allowed users, etc. |

TABLE 1-continued

| Information System | Information |
|---|---|
| Business Process/ System Management Systems | Business Process System Management Systems are used to signal process problems and workflow. Information from these systems can be used, for example, to identify security violations, performance problems, etc. |
| Network Time Protocol | Network Time Protocol Servers export the current time. |
| Application Servers | Application Servers are typically the front-end to databases. Applications servers can maintain a variety of application dependent information. |

Table 1 is provided by way of example and not limitation. Additionally, database appliance 102 can utilize various systems management protocols such as SNMP, CIM, WMI to derive, for example, valid network components or systems and system health.

To the extent desired, the names or other metadata used by network services, directory services or other information systems and database server 106 can be used by database appliance 102 in applying policies to requests and database appliance 102 can simply maintain incremental metadata. For example, database appliance 102 can map between a user (i.e., a entity defined at database server 106) to a user group defined by an identity management system (e.g., a group defined at information system 110). Again, in this case, the database entity is mapped to an object defined external to database server 106 using metadata that, in this example, is maintained by information system 110.

The mappings can be arbitrarily complex and hierarchical. For example, a user can be mapped to a group, the group to a corporate division and so on. As database entities can be mapped to metadata or other information defined in information systems 110 and 112, security policies can be implemented in terms of the highest level metadata available across network management systems, directory services systems and database systems.

According to one embodiment, database appliance 102 can access information systems 110 and 112 to pull metadata. If, for example, information system 110 is an identity management system, database appliance 102 can pull metadata such as user groups from information system 110. Access can be achieved through the API calls for information system 110 or other suitable access scheme known or developed in the art. The metadata retrieved from information system 110 can be maintained by database appliance 102 (e.g., in a dedicated database, in memory or otherwise maintained) for some period of time or deleted from database appliance 102 or the data store of database appliance 102 when no longer needed. When database appliance 102 needs the metadata again, database appliance 102 can request the metadata from information system 110 again.

In operation, database appliance 102 can receive requests from database client 104 to database server 106. Each request, according to one embodiment, can be normalized to a preferred format and parsed to extract information. Each request can include a variety of information, including target (database server) IP address, source (database client address), target IP port number, target database name, statement type, procedures executed, tables to be accessed, columns to be accessed, tables to modified, columns to be modified, procedures to be created, database errors, rows of data to be returned, time of the request, user identifier and other information contained in the request. Table 2 below provides a summary of information that database appliance 102, according to one embodiment, can derive from each request:

TABLE 2

| Information From Request | Description of the Information |
|---|---|
| Requester IP Address | The network address of the computer issuing the request |
| Database IP Address | The network address of the database system to which the request is directed |
| Database Instance | The particular database instance on the machine with the given Database IP Address |
| Impact of the Request | Each database activity request has one or more impacts on the database itself. The collective impact of request can be determined. |
| Target Database Entities by Impact | For each form of impact, the database target entities involved. |
| Time/Date | The time/date of the activity request. |

Using the example of FIG. 1, the first two items in Table 2 relate to the logical network address of database client 104 and database server 106, respectively. Since there may be more than one database instance residing on database server 106, and a single database may be reached at more than one network address, the third item of Table 2 indicates the database instance to which the request is directed. The fourth item in Table 2, discussed below, relates to the overall impact(s) a request has on a database and the fifth item relates to the entities of the database effected. The last item in Table 2 relates to the time/date of the request.

Returning to the database activity request impact, a database, generally speaking, is a mix of containment relationships and reference relationships. At the highest level of organization, it is the containment relationships that dominate. From the standpoint of the ANSI/ISO SQL standards, database activity requests are SQL operations and are interpreted in a "SQL-environment." Such an environment, in turn, contains one or more "catalogs," which in turn contain one for "SQL-Schema" elements. Database objects, such as tables, columns, views, and stored procedures are contained in the SQL-Schema entity. Columns and rows are contained in the table entity. Within a schema, table objects are related to one another by means of reference relationships. Some database implementations omit some of these levels. For example, some database implementations omit the catalog level in the hierarchy.

Database activity requests range from the very simple to the very complex. A request such as:
SELECT COUNT (*) AS NUM_ROWS
FROM SUPPLIER
simply reads the rows in the table "SUPPLIER" and counts them. The request:
SELECT SUPPLIER.SUPPLIER_NUMBER
FROM SUPPLIER WHERE SUPPLIER .STATUS<
   (SELECT MAX (SUPPLIER.STATUS)
   FROM SUPPLIER)
Contains a sub-select and corresponds to finding the supplier identifiers associated with those suppliers whose current status is less than the maximum status for any supplier. As a final example, the request:
UPDATE PART
SET CITY=(SELECT SUPPLIER.CITY
   FROM SUPPLIER
   WHERE SUPPLIER.SUPPLIER_NUMBER='42')
WHERE PART.COLOR='RED'
updates the "CITY" column for all rows in the PART table, where the column COLOR has the value Red, to the supplier city taken from the supplier table where the SUPPLIR_NUMBER equal to 42. The complexity of a single statement can become enormous with thousands of lines of SQL code referring to thousands of tables, views, columns, schemas, or other entities.

Database appliance 102 can parse the request and determine the impact of the request along with the database entities that are effected. Table 3 below provides example request impacts that can be defined by database appliance 102. The first column of Table 3 lists example defined impacts and the second column of Table 3 lists the corresponding SQL commands and effected entities.

TABLE 3

| Request Impact | Description of Impact |
| --- | --- |
| Read/Query | Corresponds to a "SELECT" action. The effected entities include the table read as well as the specific columns accessed. |
| Minor Data Create | Corresponds to an "INSERT" action. The effected entities include the table to which rows are added. |
| Minor Data Modify | Corresponds to an "UPDATE" or "DELETE" action. The effected entities include the table whose rows were updated or deleted and, in the case of an "UPDATE" the modified columns. |
| Mass Data Modify | Corresponds to a "TRUNCATE" action. The effected entities are the tables whose rows are deleted. |
| Metadata Read Query | Corresponds to a "DESCRIBE" action. The effected entities include the table whose metadata is read. |
| Metadata Modify | Corresponds to a "CREATE", "ALTER" or "DROP" action. The effected entity is the target table. |
| Procedure Execute | Corresponds to the execution of a stored procedure. The effected entity is the procedure that is executed. |
| Procedure Modify | Corresponds to "CREATE" or "DROP" of a stored procedure. The effected entity is the procedure that is created or destroyed. |
| Permissions Manipulation | Corresponds to a "GRANT" or "REVOKE" of a permission held by a user. The effected entity is the user. |

Table 3 is provided by way of example and additional or alternative impacts can be defined. Additionally, impacts can be defined in terms of other database implementations including, but not limited to, Oracle databases and IBM DB2 databases.

A request can have zero or more impacts depending on its nature and complexity. For example, according to the impacts defined in Table 3, a request to set a session's idle timeout period has zero impacts. The following example request, on the other hand, has a Read Query impact and a Minor Data Modify Impact.
UPDATE PART
SET CITY=(SELECT SUPPLIER.CITY
    FROM SUPPLIER
    WHERE SUPPLIER.SUPPLIER_NUMBER='42')
WHERE PART.COLOR='RED'

In the above example, database appliance 102 determines additional information related to the request (e.g., request impacts) based on the information in the request (e.g., various SQL commands). Database appliance 102 can also determine other information related to the request based on the mappings discussed above. For example, database appliance can determine the user groups to which the user identified in the database request belongs and other information related to the request. Some of the information related to the request, but not directly contained in the request, can be retrieved from other systems such as identity management systems, LDAP servers and other information systems as discussed above.

The information related to the request can include characteristics of the request and request context characteristics. Examples of characteristics of the request include the user ID in the request or the user group to which the user ID belongs. Another example of a characteristic of the request is whether the requesting IP address corresponds to a computer in a particular group defined in a network services system or directory services system. Characteristics of the request include any information derivable from the network-level protocol exchanges associated with the request, including, by way of example, user credentials, logical network source addresses, physical network source addresses, low-level session characteristics, database entities that are the target of the request and the nature of the request's database activity. It should be noted that the database entities that are the targets of a particular requests in some cases may not be determinable just from inspecting the request itself. Instead, the union of the request itself, session-level configuration and database entity mapping can be used to yield the collection of database entities that will be affected as well as the nature of the effect. Context characteristics include, but are not limited to, the time of day, macro-level session characteristics, previous requests and their disposition and other information. An example of a request context characteristic includes the sequence of previous requests made during a set of sessions, including across multiple database servers.

Turning now to the enforcement of policies, criteria for matching a policy can be defined in terms of the characteristics of a request or the context of the request. If the criteria of the request is matched based on the information related to the request, the policy defines the actions to be taken. Such actions include allowing the request, logging the request to an audit trail, generating alerts of various types, blocking the request or taking another pre-defined action. According to one embodiment, each policy applied by database appliance 102 can include a set of conditions defining what matches the policy and a set of actions to be taken should a match occur. The conditions that determine a potential match may be zero or more characteristics of the particular request made and zero or more characteristics of the context in which the request is made. To this end, each policy can include an activity request description that serves to determine the sort of database activity requests that are governed by the policy. The activity request description, according to one embodiment of the present invention, is an expression containing multiple fields describing matching conditions for several criteria. The activity request definition can be made in terms of information maintained by database appliance 102 or other systems (e.g., information systems 110 and 112). Table 4 below provides example fields and field descriptions for a policy's activity request description. Table 4 is provided by way of example and other activity request descriptions can be utilized by database appliance 102.

| Field | Description of Field |
| --- | --- |
| User | Corresponds to the user making the database activity request. It can include one or more specific users or one or more user groups. |
| Network Address | Corresponds to the physical or logical source address of the network traffic associated with the request. It can include an explicit collection of MAC or IP addresses, a range of addresses or a defined group of machines. |

| Field | Description of Field |
|---|---|
| Database Action | Corresponds to the actual activity being denoted by the request: SELECT, INSERT, CREATE, DELETE, SET, etc., a request impact or a collection of activities. |
| Database Target | Corresponds to the database entity that is target of the request action or effected by the impact. This can include individual database entities or some group of entities. |
| Time/Date | Corresponds to the time/date of the database activity request. This can include a discrete time, a collection of time/date ranges with or without recurrences or other time/date definition. |

To provide an example, assume a company has a policy that database maintenance will take place during the hours of 8:00 AM to 2:00 PM Eastern on a Saturday and must be initiated either directly on the database server or directly on the database administrator ("DBA") subnet. The policy can map to fields of Table 4 as follows:

User—The policy applies to all users so the field can be left blank or an indicator of all users provided;

Network Address—The IP range for the DBA subnet can be given with the additional annotation of "NOT" to indicate that addresses outside of the range are affected;

Database Action—All Data Definition Language (DDL) and Data Control Language (DCL) constructs can be flagged;

Database Target—The policy applies to all entities within the database so the field can be left blank or an all entities indicator provided;

Time/Date—The time range of 13:00-19:00 GMT on Saturdays can be specified

Database appliance 102 can examine requests against this example policy and deny requests that match the policy.

In enforcing policies, database appliance 102 can utilize the information related to the request including metadata from information systems 110 and 112. Using the previous example, assume information system 110 includes an active directory server that defines which computers belong on the DBA subnet. The Network Address field may simply list DBA Subnet, rather than an explicit IP address range. When database appliance 102 receives a request, database appliance can make a function call to the active directory server of information system 110 to query whether the IP address of the request is part of the DBA Subnet. Thus, the policy can be applied in terms of metadata maintained by information system 110 rather than database server 106. According to other embodiments, database appliance 102 can pre-fetch all the information it needs to enforce the defined policies. In this example, database appliance 102 can pre-fetch the metadata defining which IP addresses correspond to the DBA subnet so that it does not have to consult information system 110 each time a request comes in.

As another example, assume a company has a policy that engineers can access a design table from computers connected via the engineering group LAN and database appliance 102 receives a request from user1 at IP address 168.191.1.5 to access the design table. Database appliance can make a request to information system 110 to determine if user1 is in the engineering group and make a request to information system 112 to query whether the address 168.191.1.5 is on the engineering group LAN. If, based on the metadata maintained by information systems 110 and 112, the answers to these queries are both true, the policy is satisfied and the request can be allowed. In the above example, the requests are allowed if the policies are met. However, the policy can define some other action to take such as denying the requests, beginning an audit trail or generating an alarm.

According to one embodiment of the present invention, a request can first be compared to a set of enabling policies and then to a set of disabling policies. In this case, a request will be compared to a first set of policies and, if the request matches any of the policies, the request will be selected for further processing. If the request doe's not match any of the enabling policies, the request can be rejected. Once a request matches an enabling policy, it can be compared to a set of disabling policies. If the request matches a disabling policy, the request is rejected. If the request matches an enabling policy, but not a disabling policy, the request is allowed. The sequence of applying enabling and disabling policies can be repeated as desired.

Embodiments of the present invention thus allow security policies to be defined in terms of information available across the network management systems, directory services systems and database systems. This allows, for example, the ability to define a policy that a member of group Y (as defined by a directory services system) or a member of group Z (again as defined by the directory services system) so long as the members of group Z are accessing the database servers computer systems in an address range R controller by a network services system. As the definitions of Y, Z and R can be managed by the directory services system and network services system, the definitions of Y, Z and R can change without requiring an update to the security policy, database client or database server. Security policies can also be defined in terms of information that is defined at database appliance 102. This allows security policies to be enforced in terms of metadata and categories not otherwise defined in the aggregated network environment.

Figure 2:
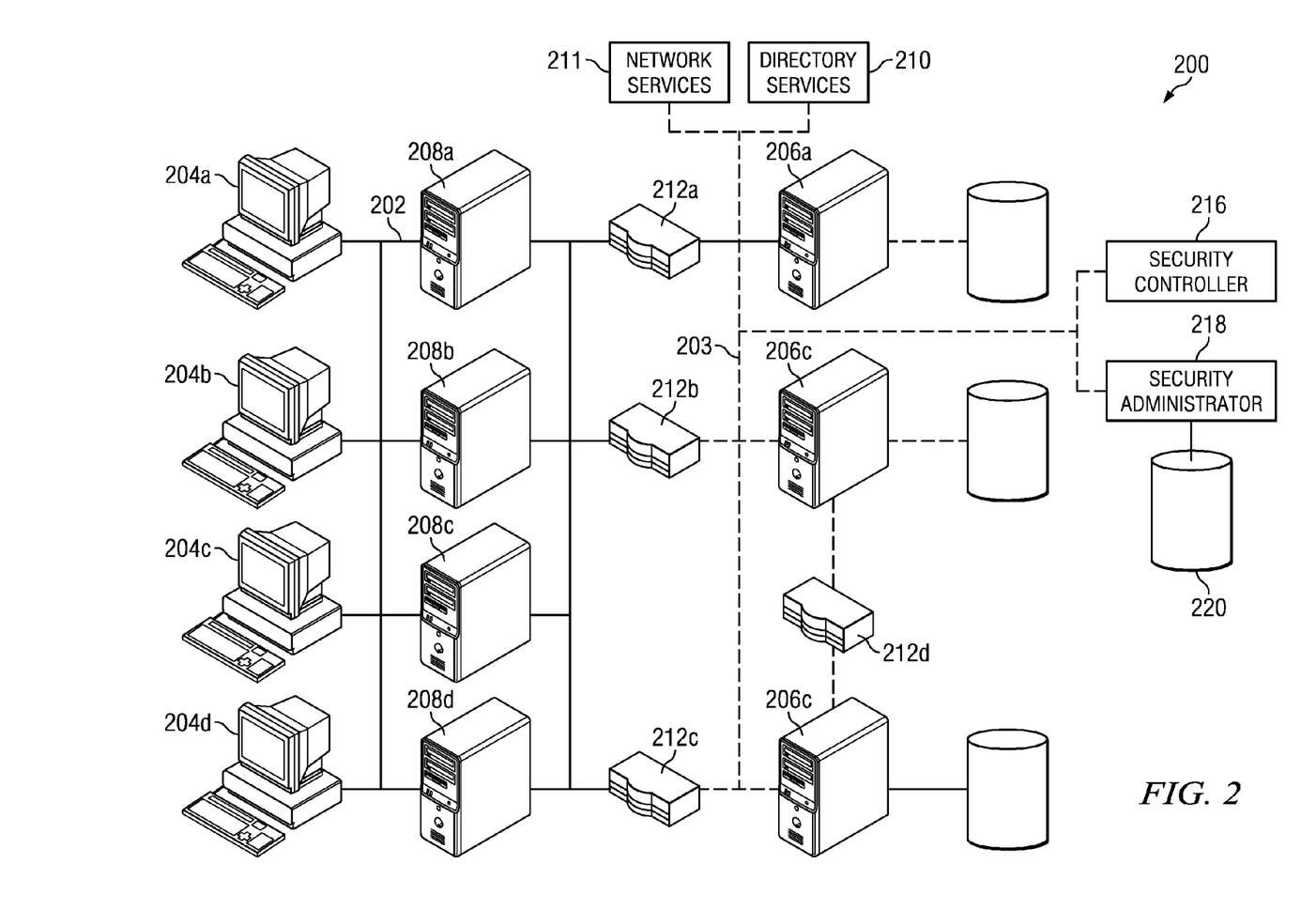
FIG. 2 is a diagrammatic representation of another embodiment of a system in which embodiments of the present invention can be implemented.

FIG. 2 is a diagrammatic representation of another embodiment of a system 200 in which embodiments of the present invention can be implemented. System 200 can include an open network 202 and a security network 203 (represented by the dashed lines). Security network 203 can share hardware with open network 202, but represents the connections between components for allowing enforcement of policies and connections between components behind the database appliances. Database clients 204a-d can communicate directly with database servers 206a-c or though intermediary application servers 208a-d. Application servers 208a-d can function as database clients even as they perform a server role for database clients 204a-d. Moreover, one database server 206 can act as a database client to another database server. For example, database server 206c can act as a database client to database server 206b. Database clients 204a-d, application servers 208a-d and database servers 206a-c can interact in the context of authentication and user account information provided by directory services system 210. The structure of network 202 itself is managed through network services system 211, which can itself be distributed.

According to one embodiment of the present invention, database appliances 212a-d can leverage the network access ports of database severs so that all requests to a database server must pass through a database appliance 212. In the example of FIG. 2, database appliance 212a is at the control point between application servers 208a-d and database server 206a, database appliance 212b is at the control point between application servers 208a-d and database server 206b, database appliance 212c is at the control point between application servers 208a-d and database server 206c and database appliance 212d is at the control point between database server 206c and database server 206b. Configuration and monitoring of database appliances 212a-d can be managed by one or more security controller applications (represented as a logical function at 216) that can run on one or more of database appliances 212a-d. A security administration application 218, which can run on one or more of database appliances 212a-d or an administrator computer, can communicate with and configure security controller application(s) 216. A security database 220 can maintain information utilized by database appliances 212a-d. The security components can communicate with directory services system 210 and network services system 211 to leverage metadata maintained by these systems.

As discussed in conjunction with FIG. 1, embodiments of the present invention allow security policies to be imposed in terms of metadata or other information maintained across network services, directory services and database servers. To the extent desired, existing names at database servers 206a-c, directory services system 210 and network services system 211 can be used and the incremental metadata (any metadata used for policies not already defined in the other systems) can be defined through security administration application 218 and stored in security database 220. The metadata in security database 220 can be single-level metadata or multi-level metadata for defining groups of entities that may be nested and may span multiple database servers.

Each database appliance 212 can receive requests directed to the respective database server 206 and apply policies using metadata or other information maintained at that database appliance, security database 220, network services system 211, directory services system 210 and database servers 206a-c. The security policies applied by database appliances 212a-d can be in addition to or in lieu of security policies applied by database servers 206a-c. Thus, embodiments of the present invention can compliment or replace existing database security policies.

Figure 3:
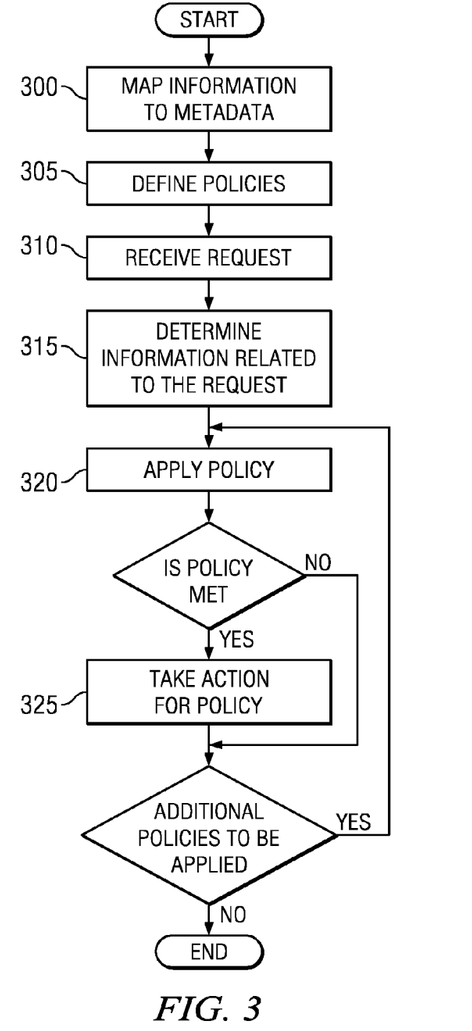
FIG. 3 is a flow chart illustrating one embodiment of a method for implementing security policies.

FIG. 3 is a flow chart illustrating one embodiment of a method for implementing security policies. The method of FIG. 3 can be implemented as a set of computer instructions stored on a computer readable medium (e.g., at a database appliance) that are executable by a computer processor.

At step 300, one or more pieces of information discoverable or derivable from a database action request and information regarding the context of requests can be mapped to information defined external to the database for which policies are being implemented. For example, database users can be mapped to groups (or to user-understandable names that are in turn mapped to groups), IP addresses can be mapped to departments, times can be mapped to time ranges and so on. The mappings can be defined by the database appliance enforcing policies or defined at other systems external to the database system and database appliance and can be arbitrarily complex or hierarchical.

At step 305, a set of policies can be defined at the database appliance. Each policy can include a specification of the type of activity request to which it applies and the action to be taken if the policy is met. The location of the information needed to enforce a policy can be specified as part of the policy or can be otherwise specified. For example, if a policy relies on information held at an external system, such as an LDAP server, the function calls for the LDAP server can be specified at the database appliance. The information from the external system can be preloaded at the database appliance or the database appliance can access the information as needed. According to other embodiments, the database appliance can access a security database that either replicates the information at the external system or includes incremental metadata.

The database appliance, at step 310, can receive a database request from a database client and, at step 315, determine a set of information related to the request. This can include determining the metadata or other information related to the request according to the mappings as defined at step 300. At step 320, the database appliance can apply the defined policies to the request. Accordingly, the database appliance 320 can compare the information related to the request to the conditions of each policy to determine whether the conditions are met. As described below, this comparison can be optimized for SIMD processors. According to one embodiment, the database appliance can first apply a set of enabling policies and then disabling policies.

At step 325 an action can be taken based on which policies are met. In the case in which enabling policies are applied first and then disabling policies applied, the request will be allowed if at least one enabling policy is met, but no disabling policies are met. Otherwise the request can be denied. Other actions can also be taken, such as generating alarms and so on. While various steps are discussed separately above, the steps can be performed together or in different orders. The steps of FIG. 3 can be repeated as needed or desired. Moreover, multiple steps can be performed together. For example, the database appliance can determine information related to the request as part of applying a policy to the request.

Figure 4:
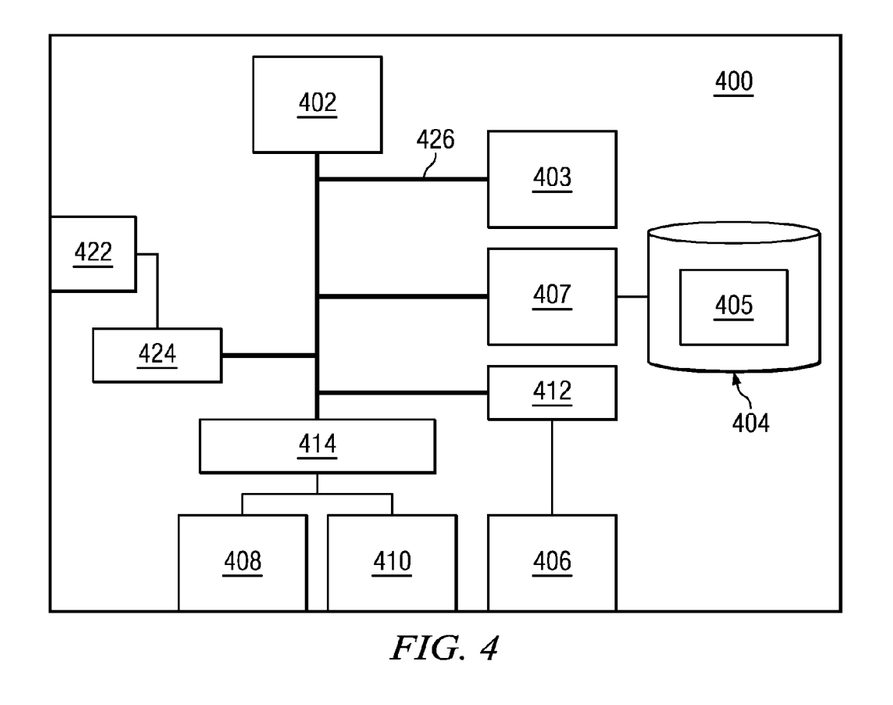
FIG. 4 is a diagrammatic representation of one embodiment of a database appliance.

FIG. 4 provides a diagrammatic representation of one embodiment of a computing device 400 that can act as a database appliance. Computing device 400 can include a processor 402, such as an Intel Pentium 4 based processor (Intel and Pentium are trademarks of Intel Corporation of Santa Clara, Calif.), an ASIC, a RISC or other processor known in the art, a primary memory 403 (e.g., RAM, ROM, Flash Memory, EEPROM or other computer readable medium known in the art) and a secondary memory 404 (e.g., a hard drive, disk drive, optical drive or other computer readable medium known in the art). A memory controller 407 can control access to secondary memory 404. Computing device 400 can include I/O interfaces, such as video interface 406 and universal serial bus ("USB") interfaces 408 and 410 to connect to input and output devices. A video controller 412 can control interactions over the video interface 406 and a USB controller 414 can control interactions via USB interfaces 408 and 410. Computing device 400 can include a variety of input devices such as a keyboard and a mouse and output devices such as display devices. Computing device 400 can further include a network interface 422 (e.g., an Ethernet port or other network interface) and a network controller 424 to control the flow of data over network interface 422. Various components of computing device 400 can be connected by a bus 426.

Secondary memory 404 can store a variety of computer instructions that include, for example, an operating system such as a Windows operating system (Windows is a trademark of Redmond, Wash. based Microsoft Corporation) or a Linux operating system and applications that run on the operating system, along with a variety of data. More particularly, secondary memory 404 can store policy engine application 405. During execution by processor 402, portions of database appliance applications 405 can be stored in secondary memory 404 and/or primary memory 403. Database appliance applications 405 can be implemented as multiple programs, a single program or according to any suitable programming architecture and language(s) known in the art.

Computing device 400 of FIG. 4 is provided by way of example only and it should be understood that embodiments of the present invention can implemented as a set of computer instructions stored on a computer readable medium in a variety of computing devices including, but not limited to, servers, routers or other computing devices in the request path between a database client and database server. Moreover, the embodiment of FIG. 4 is provided by way of example, and can comprise other components and can have a variety of form factors. In one embodiment, the database appliance is rack mounted server and has a height of approximately one height unit.

Although a particular embodiment of database appliance is described in conjunction with FIG. 4, embodiments of the present invention can be implemented in any database appliance or device in the message path between a database client and database server. Example database appliances are described in U.S. patent application Ser. Nos. 11/153,873; 10/375,393; 10/933,790; 10/933,786; 10/441,714; 10/934,887, each of which is fully incorporated herein by reference.

According to one embodiment of the present invention, the database appliance can normalize a received database request to a preferred format and parse the normalized requests to extract information, such as user names, SQL statements and other pieces of information. Using the information in the request and other information, the database appliance can determine additional information related to the request, including additional request characteristics and request context characteristics. The database appliance can then apply policies to the request. According to one embodiment of the present invention, processor 402 utilized by the database appliance for applying policies can be a SIMD-based processor. Processing of policies can be optimized for processing by the SIMD processor.

Figure 5:
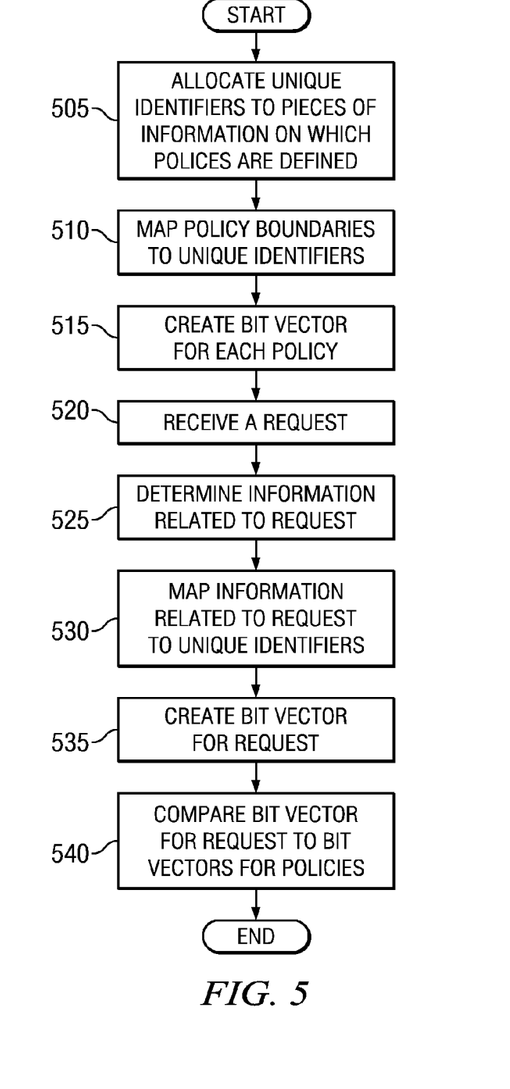
FIG. 5 is a flow chart illustrating one embodiment of a method for optimizing the application of security policies for a single instruction, multiple data processor.

FIG. 5 is a flow chart illustrating one embodiment of a method for SIMD based processing. The method of FIG. 5 can be implemented according to one embodiment as a set of computer executable instructions. Generally speaking, the approach involves separating the computation into three phases that are performed and re-performed at different points. The first two computations are performed to create data structures that will enable efficient algorithms in the third computation. According to one embodiment, it is the third computation that produces any result that is directly related to the overall rule engine execution.

At step 505, all of the pieces of information on which policies are to be defined are allocated a unique identifier. That is, each database entity, group, time range, or request characteristic or request context characteristic to which policies are applied is assigned a unique identifier such as a 32-bit integer value. As an example, an IP address for a machine can be translated to a single 32-bit integer value, with two lookup functions, one of which takes the 32-bit integer and returns the IP address, the other which takes the IP address and returns the 32-bit number.

At step 510, all of the boundaries upon which each policy is defined is mapped into an identifier which can be compared in the policy enforcement phase to the identifiers created in step 505. To follow the IP address example, a policy can allow a request from a range of IP addresses. Each IP address allowed by the policy can be translated into a 32-bit value using the same transformation as the functions in step 505. So, if the IP address in the example of step 505 is approved under the policy, the IP address would map to one of the identifiers created in step 510 for the IP address policy. At step 515, a bit vector is created for the policy. According to one embodiment, the bit vector for the policy is created with bits set for each identified piece of information in the policy definition being set to 1. For example, for each IP address in the policy, the appropriate bit is set in the bit vector to indicate that the policy applies to that IP address.

At step 520, the database appliance receives a request. At step 525, the database appliance determines the information related to the request including the request characteristics and the request context characteristics. The pieces of information related to the request are translated into their representative 32-bit values (step 530) using the same translations as used in step 505 and a bit vector is formed (step 535) representing the information related to the request. At step 540 the bit vector for a request is compared to the bit vector for a policy to determine if there is a match. If there is a match, the appropriate action is taken as defined by the policy (e.g., the request is selected for further processing, the request is transmitted to the database server, the request is denied, an alarm is generated or other defined action taken). If the bit vector for the request does not match the bit vector for the policy, the bit vector can be compared to the next policy until a policy is matched or the policies exhausted. Again, however, the policies may be applied in rounds, with the first round of policies being enabling policies and the second round being disabling policies. The steps of FIG. 5 can be repeated as needed or desired.

Thus, the specifications of constraints are transformed into alternative representations that exploit both the characteristics of database systems and the hardware organization of modern SIMD-capable microprocessors. The characteristic of database systems that is exploited is the natural range of scale. Database systems are characterized by entities of different types: users, schemas, tables, columns, stored procedures, views, constraints, network addresses, applications, etc. Each of these individually have a maximum practical size that is quite small. Typical complex database systems may have 200,000 such objects while truly large systems may have 10 million. A database may have billions or trillions of actual data tuples, but these reside in a much smaller number of containing entities and are requested by a constrained number of users, applications, and systems. As a result, the entities and other objects to which a policy applies can be represented using 32-bit integers. Further, the policy can be represented in a fashion suitable for a matching computation through the use of a bit-vector. If the database entity "A" is mapped to integer "n" through this process, then if "A" was a participant in a policy the "n-th" bit in the bit-vector representation would have the value 1.

Each request is decoded and the information related to the request is mapped to the appropriate integer codes. This forms a numeric representation of the activity request. The numeric representation of the activity request is transformed into a bit vector and compared to the bit-vector representations of the policies. These comparisons and lookups readily map onto the SIMD-style execution units within modern IA-32, IA-32e, AMD64, and PowerPC microprocessors and can be implemented with other processors known or developed in the art.

A further refinement is possible to make more efficient use of the computer system's memory hierarchy. In most computer systems, the highest performance memory is the register file and can be accessed in approximately 300 picoseconds. The next level of the memory hierarchy is the L1 cache and is accessible in approximately 2000 picoseconds. L2 cache can supply data in approximately 10000 picoseconds, while main memory requires approximately 75000 picoseconds. Because the integer codes to which information is mapped are abstractions, these codes can be changed over time to place commonly requested values closer together. For example, if the group Engineering is mapped to one integer code and the table name R&D table is mapped to another integer value, and over time it is discovered that Engineering and R&D table are often characteristics of the same request, the integer codes can be moved closer together. While there may be a great many characteristics (millions or more) that must be able to be mapped, actual operating traffic will likely be focused on a small fraction of that number. By moving those values close together, the effectiveness of the memory hierarchy can be more fully exploited.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope of this invention as claimed below.

What is claimed is:

1. A method for applying security policies to database requests comprising:
    mapping one or more pieces of information to a corresponding first set of metadata at a database appliance coupled between a database server and a database client, wherein mapping the one or more pieces of information comprises mapping one or more entities comprising at least a database table as defined at a database managed by the database server to a first set of metadata and storing the first set of metadata at the database appliance;
    receiving a database request referencing the one or more entities at the database from the database client at the database appliance according to a database language supported by the database server;
    at the database appliance:
        determining a second set of metadata corresponding to the database request, wherein the second set of metadata at least partially overlaps with the first set of metadata;
        selecting one or more policies based on the database request, wherein the one or more policies comprises an enabling policy or a disabling policy and each policy comprises an associated set of conditions and an action;
        applying the one or more policies at the database appliance at least partially based on metadata in both the first set of metadata and the second set of metadata wherein applying a policy comprises evaluating at least a portion of the first set of metadata or at least a portion of the second set of metadata using the set of conditions associated with the policy to determine if the policy is met and taking the action associated with the policy if the policy is met;
    wherein mapping one or more pieces of information to the corresponding first set of metadata at the database appliance further comprises mapping a user name for a user entity as defined at the database to a user group not defined at the database;
    wherein determining the second set of metadata corresponding to the database request further comprises fetching at least a portion of the second set of metadata corresponding to the database request from an information system external to the database client and the database server; and
    wherein applying one or more policies comprises applying a set of enabling policies and, if the database request meets at least one enabling policy, applying a set of disabling policies.

2. The method of claim 1, wherein mapping one or more pieces of information to the corresponding first set of metadata at the database appliance further comprises mapping a network address to a machine group.

3. The method of claim 1, wherein mapping one or more pieces of information to the corresponding first set of metadata at the database appliance further comprises defining a request impact.

4. The method of claim 1, further comprising pre-fetching a third set of metadata from an information system external to the database client and the database server, wherein at least a portion of the second set of metadata corresponding to the database request comprises the third set of metadata.

5. The method of claim 1, wherein applying one or more policies comprises applying the one or more policies based on a uniform name space reflecting an aggregate network environment.

6. A method for applying security policies to database requests comprising:
    mapping entities comprising at least one table defined at a relational database to first representations of the entities, wherein the representations are stored at a database appliance coupled between a database client and a database server;
    at the database appliance:
    receiving a database request according to a structured query language;
    determining a set of information related to the database request that includes at least one second representation of an entity at the database appliance, wherein at least a portion of the set of information related to the database request is retrieved from an information system external to the database server and the database client;
    selecting one or more policies based on the database request, wherein the one or more policies comprises an enabling policy or a disabling policy and each policy comprises an associated set of conditions and an action;
    applying the one or more policies based on the set of information related to the database request and the first representations of the entities, wherein applying a policy comprises evaluating at least a portion of the first representation or the set of information related to the database request using the set of conditions associated with the policy to determine if the policy is met and taking the action associated with the policy if the policy is met;
    further comprising mapping a piece of information to a corresponding piece of first metadata at the database appliance, wherein if the database request includes the piece of information, the information related to the database request includes the corresponding piece of first metadata;
    wherein the piece of information is a name of an entity defined at the database as reference by the database server and the corresponding piece of first metadata is a group name; and
    wherein applying one or more policies comprises applying a set of enabling policies and, if the database request meets at least one enabling policy, applying a set of disabling policies.

7. The method of claim 6, wherein the piece of information is a name of an entity defined at the database as reference by the database server and the corresponding piece of first metadata is human readable name.

8. The method of claim 6, wherein the piece of information is a network address and the corresponding piece of first metadata is a group name corresponding to a group of machines.

9. The method of claim 6, wherein at least a portion of the information related to the database request comprises second metadata defined at the information system.

10. The method of claim 9, further comprising querying the information system to retrieve the second metadata.

11. The method of claim 10, wherein the information system comprises one of an LDAP system, an identity management system, a domain name system, a file server, a network access control system, a business process system management system, an application server or a network time protocol system.

12. The method of claim 6, wherein the information related to the request comprises request characteristics and request context characteristics.

13. A database appliance configured to connect between a database client and a database server, the database appliance comprising:
a processor;
a computer readable memory accessible by the processor;
a set of computer instructions stored on the computer readable memory, the set of computer instructions comprising instructions executable by the processor to:
map one or more entities comprising at least a database table as defined at a database managed by the database server to a first set of metadata and storing the first set of metadata at the database appliance;
for a request according to a structured query language including a name of one or more of the entities received by the database appliance, determine a set of information related to the request that includes information retrieved from an information system external to the database client and the database server, wherein the set of information includes at least one piece of second metadata;
select one or more policies based on the request, wherein the one or more policies comprises an enabling policy or a disabling policy and each policy comprises an associated set of conditions and an action;
apply the one or more policies based on the set of information related to the database request or the first set of metadata, wherein applying a policy comprises evaluating at least a portion of the set of information or the first set of metadata using the set of conditions associated with the policy to determine if the policy is met and taking the action associated with the policy if the policy is met;
wherein the set of computer instructions further comprise instructions executable to:
map a piece of information to the at least one piece of first metadata;
determine that the request includes the piece of information; and
include the at least one piece of metadata in the set of information related to the request;
wherein a piece of information from the request is a name for a database entity as referenced by the database server and the at least one piece of first metadata is a group name; and
wherein the set of computer instructions further comprise instructions executable to:
apply a set of enabling policies;
if the request meets at least one enabling policy, apply a set of disabling policies.

14. The database appliance of claim 13, wherein the piece of information from the request is a name for a database entity as referenced by the database server and the at least one piece of first metadata is a human readable name.

15. The database appliance of claim 13, wherein the piece of information is a network address and the at least one piece of first metadata is a group name corresponding to a group of machines.

16. The database appliance of claim 13, wherein at least a portion of the information related to the database request comprises the at least one piece of second metadata defined at the information system.

17. The database appliance of claim 16, wherein the set of computer instructions further comprise instructions executable to query the information system to retrieve the at least one piece of second metadata defined at the information system.

18. The database appliance of claim 17, wherein the information system comprises one of an LDAP system, an identity management system, a domain name system, a file server, a network access control system, a business process system management system, an application server or a network time protocol system.

19. The database appliance of claim 13, wherein the information related to the request comprises request characteristics and request context characteristics.

20. The method of claim 1, wherein the request is formatted according to a structured query language.

* * * * *